May 13, 1947.    A. BOUWERS    2,420,349
SCHMIDT'S OPTICAL SYSTEMS COMPRISING A CORRECTION ELEMENT
Filed Jan. 19, 1943

INVENTOR
ALBERT BOUWERS
BY *[signature]*
ATTORNEY

Patented May 13, 1947

2,420,349

UNITED STATES PATENT OFFICE 2,420,349

SCHMIDT'S OPTICAL SYSTEM COMPRISING A CORRECTION ELEMENT

Albert Bouwers, Eindhoven, Netherlands, assignor to Hartford National Bank and Trust Company, Hartford, Conn., as trustee Application January 19, 1943, Serial No. 472,918
In the Netherlands October 14, 1940

7 Claims. (Cl. 88—57)

The invention relates to an optical system of Schmidt, which, as is well-known, consists of a spherical mirror which has a correction element arranged in its centre of curvature. It is known that the manufacture of this correction element is attended with great difficulties on account of the aspherical surface of refraction which occurs therein. This system is described, for example, in Danjon et Couder "Lunettes et Telescopes," page 254.

An object of the invention is to give the correction element less complicated surfaces of refraction and thus to simplify its manufacture.

The optical system according to the invention exhibits the feature that the correction element consists of a lens or a system of lenses with spherical surfaces, which lens or system of lenses has no power or a small power. By a "lens" is meant hereinafter any body with spherical surfaces of different, but also of equal, curvatures which extend in opposite as well as in equal senses.

In the accompanying drawings forming part of the specification

Figure 1:
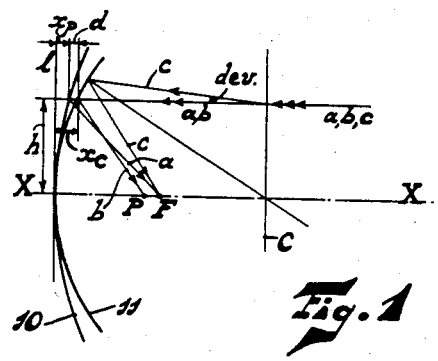
Figure 1 is a diagrammatic showing of the paths of rays meeting parabolic, uncorrected spherical and corrected spherical mirrors, respectively.

In order to acquire some insight in the functioning of the correction element according to the invention Fig. 1 represents the paths of the rays—

(a) As they would occur with a parabolic mirror, (b) As they would occur with the uncorrected spherical mirror and (c) As they occur after the mounting of the correction element in the case where the latter does not consist of a lens of finite power.

In this figure 10 and 11 denote a parabolic mirror and a spherical mirror respectively, both having the same radius of curvature at the point where they cut the axis X—X of the system. With the parabolic mirror 10 rays of light which are parallel to the axis X—X are reflected by the surface of the mirror in such manner that they pass through the focus F of the parabolic mirror. A parabolic mirror has no spherical aberration, such in contradistinction to the spherical mirror 11 with which this drawback does occur. This is manifested by the fact that the shown ray of light $b$ which is reflected by the mirror 11 cuts the axis X—X of the system between F and the vertex of the mirror at P.

Upon calculating the distance $d$ which is traversed by the ray of light when passing from the spherical surface to the parabolic surface, we obtain the following result:

For the parabolic applies:

$$x_p = \frac{h^2}{4f} \quad (1)$$

wherein $x_p$ represents the distance between the tangent $l$ at the top of the parabola and the parabola itself at a distance $h$ above the axis X—X and $f$ is the focal distance of the parabola.

At the same distance $h$ above the axis X—X, the distance between the line and the circle amounts to $$x_c = \frac{h^2}{4f} + \frac{h^4}{64f^3} + \cdots \quad (2)$$

The desired distance $d$ is now:

$$d = x_c - x_p = \frac{h^4}{64f^3} + \cdots \quad (3)$$

It would now be possible to eliminate the spherical aberration of the mirror 11 if in the rays of light would be provided a body which imparts to these rays the same retardation as the (twice traversed) body located between the spherical and parabolic surfaces. If the index of refraction of this body amounts to $n$, the thickness T of the required correction body is approximately:

$$T = d\frac{2}{n-1} = \frac{h^4}{32(n-1)f^3} \quad (4)$$

The deviation which is obtained due to such a correction body C, which is arranged in the centre of curvature of the spherical mirror 11, may be calculated from this formula, and it is found to vary with the third power of the distance from the axis. Thus, for angles which are not exceedingly large and neglecting terms of higher order, the deviation (dev.h) is:

$$\text{Dev.}_h = (n-1)\frac{dT}{dh} = \frac{h^3}{8f^3} \quad (5)$$

This deviation concentrates all the rays which fall upon the mirror surface 11, in the focus F of this mirror. The solution wherein all the rays of light are concentrated in the focus F of the marginal rays requires a correction element with a deviation in the opposite sense, which is equal to zero for the marginal rays. According to the invention the required deviation, which varies with the third power of the distance from the axis, is furnished by a lens or a system of lenses which has spherical surfaces. To that end it is necessary that this lens or system of lenses should have a sufficiently large spherical aberration in the desired sense. The calculation may be carried out with the aid of formulas for spherical aberration which are to be found in literature. The essential point is in this case that the deviation is always in first approximation proportional to the third power of the distance from the axis whilst, moreover, in the design terms of higher order may be taken into account.

According to the invention, it is now not necessary that the total power of the lens or of the system of lenses should be zero as naturally was the case with the correction elements hitherto known but a slight finite power is allowed.

By a lens or system of lenses of slight power is meant such a lens or system of lenses with which the focal distance is large with respect to that of the system of lenses to be corrected, preferably, is ten or frequently more than ten times larger.

Besides, it has been found to be still possible to keep the power of each of the compound lenses at a small value so that no further errors are introduced, a drawback which would be inherent to powerful lenses.

It is desirable that the lenses are of slight thickness, that is to say that with positive lenses their thickness is at the most about twice the minimum thickness, which is determined by the diameter and the strength, which thickness may be calculated from the approximating formula $$d = \frac{D^2}{8f} \qquad (6)$$

Wherein $d$ is the thickness and $D$ is the diameter, for with thick lenses there occur errors on account of lateral deviation in the lens.

Furthermore, with obliquely incident rays it is necessary that at least one of the lenses should be highly curved since with a given power the spherical aberration is determined by the curvature.

Figure 2:
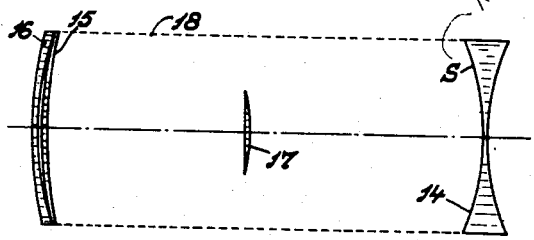
Fig. 2 illustrates, diagrammatically, one embodiment of the invention.

One embodiment of such an optical system is represented, by way of example, in Fig. 2. The correction element consists of a positive lens 15 and a negative lens 16 whilst the surface on which an image of a distant object is formed by means of a mirror S and a correction element, is formed by a spherical surface 17 formed as a table. For the sake of simplicity, in this mode of execution for the lenses 15 and 16 use is made of ordinary spectacle-glasses whilst also a spectacle-glass is utilized as the basis for the mirror surface S. This surface is provided on the left-hand side of a bi-concave glass of a power or about −10. The radius of curvature of this surface is about 10.5 cms. so that the focal distance of this mirror is about 5.25 cms. The positive lens 15 has a power of about +1 and a curvature of the concave surface of about −6 whereas the negative lens 16 is formed as a negative meniscus glass with a curvature of the concave surface of about −8 and a power of about −1.7. The spherical surface 17 is concentric with the mirror surface S and is located in the focus of this mirror. Instead of the ordinary spectacle-glasses utilized in the present instance use may, of course, also be made of lenses of the same dimensions.

It is possible to obtain with the aid of these means on a spherical surface 17 an image of an illuminated wire gauze located at a distance of 1.5 metres from the mirror, in which image lines with spaces of 20 microns are distinctly separated. When the correction element consisting of the lenses 15 and 16 is removed, the sharpness of the image is completely marred.

Due to the somewhat negative power of the correction lenses the image is smaller than without the said lenses. This remark also applies to a negative lens alone, with which also an improved image may be obtained when the lens has the proper curvature. With the use of a positive lens the image is enlarged. It is surprising that the image remains satisfactory as long as the lens is weak and consequently has a focal distance which is large with respect to that of the mirror.

A negative correction lens or system of lenses may be advantageous since, without increase of the diameter of the correcting system, it affords an increase of the power of the total system. With the aid of these means it has been found to be possible to give a camera, for example, an aperture of 1:0.8. In these cases, wherein consequently the correction element is formed by a lens or system of lenses of finite power, the system according to the invention is in this respect fundamentally different from that of Schmidt since with the latter system the correction element does not contribute to the power of the objective.

Figure 3:
Fig. 3 illustrates oblique incidence on a detail of Fig. 2.
Figure 4:
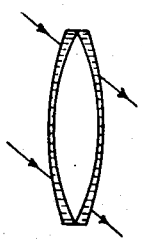
Fig. 4 is a modification of the detail shown in Fig. 3.

Errors may still occur due to the fact that obliquely incident rays of light cut the surface of the lens above and below the axis at widely different angles. They may now be remedied by curving both the positive lens and the negative lens in the same sense or, if use is made of two lenses of the same sign, by curving them in opposite senses. It is thus achieved that rays which fall very obliquely upon the strongly curved first lens, for example the negative lens of Fig. 3, also fall obliquely upon the second positive lens of this figure, owing to which both the divergence and the convergence are stronger than would be the case with a more normal incidence. The two shown rays of light, which were initially parallel to one another, are still substantially parallel after leaving the second lens; there has only taken place a slight displacement of these rays of light, which displacement is practically invisible in the figure. Likewise, rays which fall more perpendicularly through the second lens. With lenses which, as is shown in Fig. 4, are curved in opposite senses, the total deviation is also substantially independent of the angle of incidence. In order to keep the curvatures, however, as small as possible, it may be advantageous, in accordance with the invention, that the glass of at least one of the lenses has a large refraction index.

Whilst in the example according to Fig. 2 an incident beam of light of mutually parallel rays of light was concerned and in this example the starting point in the construction of the correction element is formed by a parabolic mirror which determined, in comparison with a spherical mirror, the shape of the correction element, it is possible in an analogous manner, if an image of an object located at a finite distance from the optical system has to be formed, to derive from an imaginary ellipsoidal mirror the correction element pertaining to a spherical mirror. With a spherical mirror having a radius of 16 cms. and serving to form from an object at a finite distance an image which is reduced 15 times, the applicant developed in this way a correction element which consisted of two negative lenses curved in opposite senses and having radii of curvature of 7.5 and 7.9 cms. and an index of refraction of 1.55. In this example the largest circle of confusion in an image of 2.5 to 2.5 square cms. had, with an aperture ratio of the system of 1:0.9, no longer any disturbing effect whilst for the same mirror without correction body the diameter of this circle of confusion was about 2.5 mms. In both cases the transverse aberrations which occur are less than half these amounts.

The correction element according to the invention may be utilized in numerous cases.

The system according to the invention may be advantageously utilized, for example, in a photographic apparatus. According to one favourable embodiment, the photo-sensitive material rests on a table which is arranged in the focus of the spherical mirror and which is concentric with the mirror surface. In this case we obtain approximately the construction shown in Fig. 2 wherein the lenses 15 and 16, the mirror S and the table 17 are united by a cylinder 18 (shown in dotted lines) so as to form a unit. If in this case the image is of the order of magnitude of 16 to 12 sq. mms., the optical system may consist of ordinary spectacle-glasses which are naturally less expensive than specially ground lenses. With spectacle-glasses alone it is possible to obtain in the whole image surface of 12×16 sq. mms. a sharpness of about 20 microns with an objective aperture of about 1:0.9. The camera would have a diameter of about 5 cms. and a length of 10 cms. whilst in a small lateral extension the rollers for guiding the film may be housed. By the above-mentioned expedients it is possible to manufacture a very cheap camera which would be suitable for numerous applications and which, in spite of its large aperture, affords a sufficient depth of field. The system according to the invention may also be utilized advantageously for projection purposes, in which event the object is small and the image is large.

Furthermore, the system according to the invention may also be utilized successfully in telescopes. Since with this kind of spy-glass there is frequently only a problem of correcting for angles of small values, the correction element may advantageously consist in this case of only a single lens.

What I claim is:

1. In combination with an optical system according to Schmidt, comprising a spherical mirror and a correction element therefor arranged substantially in the center of curvature of said mirror and consisting of two lenses having spherical surfaces and at most small powers, a table having a spherical surface concentric with the surface of the mirror arranged in the focus of said mirror.

2. In a photographic apparatus, in combination, an optical system according to Schmidt, comprising a spherical mirror and a correction element therefor arranged substantially in the center of curvature of said mirror and consisting of lenses having spherical surfaces, at most small powers and the dimensions of spectacle lenses, and a table having a spherical surface concentric with the surface of said mirror and calculated for an image of the order of magnitude of 16×22 sq. mms., arranged in the focus of said mirror.

3. In combination with an optical system according to Schmidt, comprising a spherical mirror and a correction element therefor arranged substantially in the center of curvature of said mirror and consisting of at least one lens having a spherical surface and at most a small power, a table having a spherical surface concentric with the surface of the mirror arranged in the focus of said mirror.

4. In combination with an optical system according to Schmidt, comprising a spherical mirror and a correction element therefor arranged substantially in the center of curvature of said mirror and consisting of a system of lenses having spherical surfaces, at most small powers, and the dimensions of spectacle lenses, a table having a spherical surface concentric with the surface of the mirror arranged in the focus of said mirror.

5. In combination with an optical system according to Schmidt, comprising a spherical mirror being a concave lens formed as a mirror and having the dimensions of a spectacle lens, and a correction element for said mirror arranged substantially in the center of curvature of said mirror and consisting of at least one lens having a spherical surface and at most a small power, a table having a spherical surface concentric with the surface of the mirror arranged in the focus of said mirror.

6. In a photographic apparatus, in combination, an optical system according to Schmidt, comprising a spherical mirror and a correction element therefor arranged substantially in the center of curvature of said mirror and consisting of a plurality of lenses having spherical surfaces and at most small powers, and a table having a spherical surface concentric with the surface of said mirror arranged in the focus of said mirror.

7. In a telescope, in combination, an optical system according to Schmidt, comprising a spherical mirror and a correction element therefor arranged substantially in the center of curvature of said mirror and consisting of a single lens having a spherical surface and at most a small power, and a table having a spherical surface concentric with the surface of said mirror arranged in the focus of said mirror.

ALBERT BOUWERS.

REFERENCES CITED

The following references are of record in the file of this patent:

UNITED STATES PATENTS

| Number | Name | Date |
| --- | --- | --- |
| 620,978 | Schupmann | Mar. 14, 1899 |
| 2,141,884 | Sonnefeld | Dec. 27, 1938 |
| 2,170,979 | Straubel | Aug. 29, 1939 |
| 969,785 | Kellner | Sept. 13, 1910 |
| 2,229,302 | Martin et al. | Jan. 21, 1941 |
| 1,967,214 | Acht | July 24, 1934 |

FOREIGN PATENTS

| Number | Country | Date |
| --- | --- | --- |
| 82,671 | Germany | Aug. 7, 1895 |
| 544,694 | Great Britain | Apr. 23, 1942 |